United States Patent [19]

Le Garfe et al.

[11] 4,214,692
[45] Jul. 29, 1980

[54] BUTT-WELDING APPARATUS FOR ASSEMBLING AND LAYING PIPE STRINGS IN DEEP WATER

[75] Inventors: Roger J. Le Garfe, Reze; Edmond Pignal, Thonon; Charles J. Magloire, Chatenay-Malabry, all of France

[73] Assignees: Compagnie Francaise des Petroles; Societe Nationale Elf Aquitaine (Production), both of Paris; Ateliers et Chantiers de Bretagne—A.C.B., Nantes; Etudes Petrolieres Marines; Compagnie Generale pour les Developpements Operationnels des Richesses Sous-Marines (DORIS), both of Paris; Compagnie Maritime d'Expertises, Marseille, all of France

[21] Appl. No.: 891,782

[22] Filed: Mar. 30, 1978

[30] Foreign Application Priority Data

Mar. 30, 1977 [FR] France ............................ 77 09434

[51] Int. Cl.² ............................................ B23K 19/00
[52] U.S. Cl. .............................. 228/44.1 R; 228/44.5; 228/49 R; 228/56.5
[58] Field of Search ............... 228/49, 44.1 R, 3.1, 228/44.5, 56.5

[56] References Cited

U.S. PATENT DOCUMENTS

| | | | |
|---|---|---|---|
| 2,376,765 | 5/1945 | Forbes | 228/44.1 R |
| 2,392,824 | 1/1946 | Lytle | 228/44.1 R |
| 4,060,190 | 11/1977 | Paolini | 228/44.1 R |
| 4,103,815 | 8/1978 | Yokokawa | 228/44.1 R |

*Primary Examiner*—Francis S. Husar
*Assistant Examiner*—Gene P. Crosby
*Attorney, Agent, or Firm*—Sughrue, Rothwell, Mion, Zinn and Macpeak

[57] ABSTRACT

Butt-welding apparatus for welding two pipes, e.g. for the shipboard welding of a laid pipe and a towed pipe, comprises a frame for receiving the pipe ends, means for securing the pipe ends relative to the frame and compensation means for causing movement of one pipe relative to the other to compensate for any shrinkage caused by the welding operation and by preheating the pipe ends to be welded.

6 Claims, 10 Drawing Figures

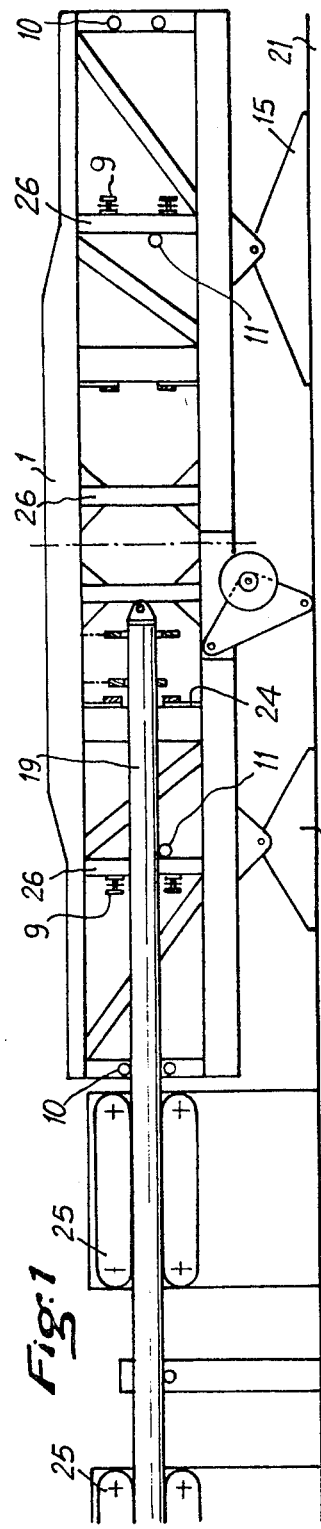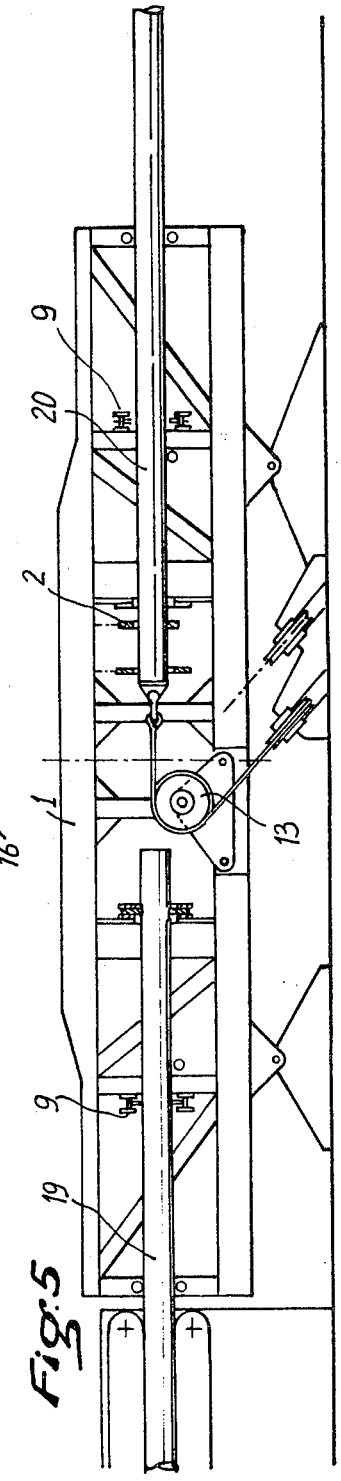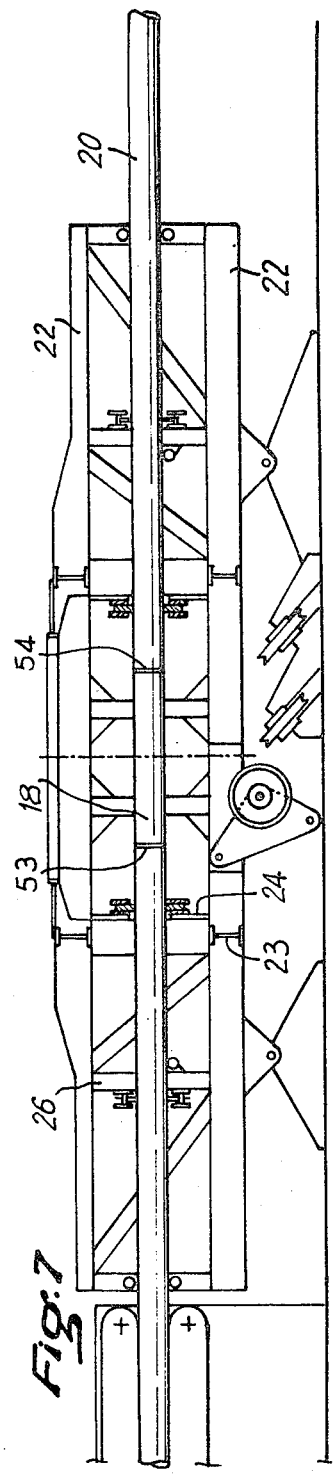

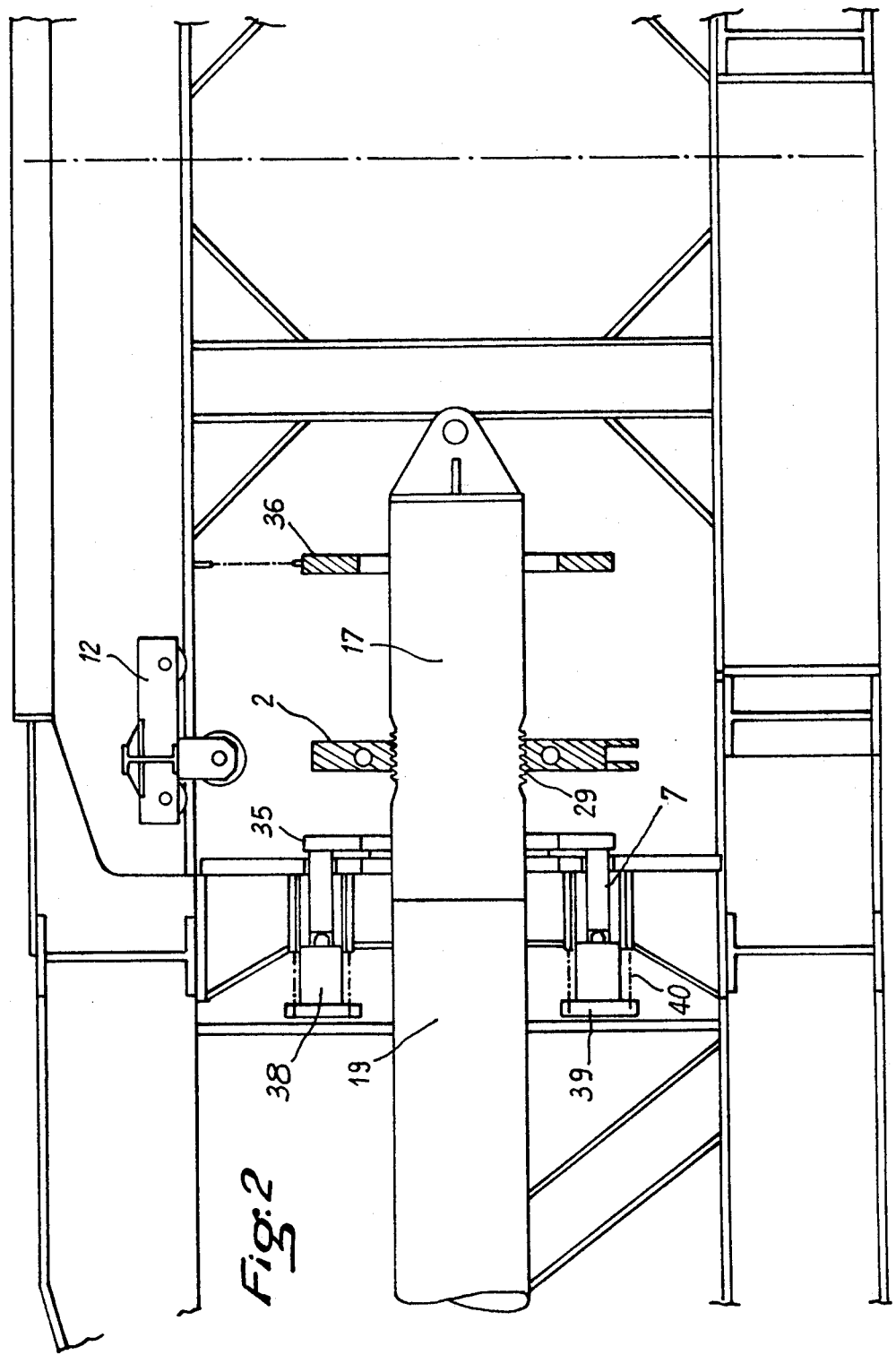

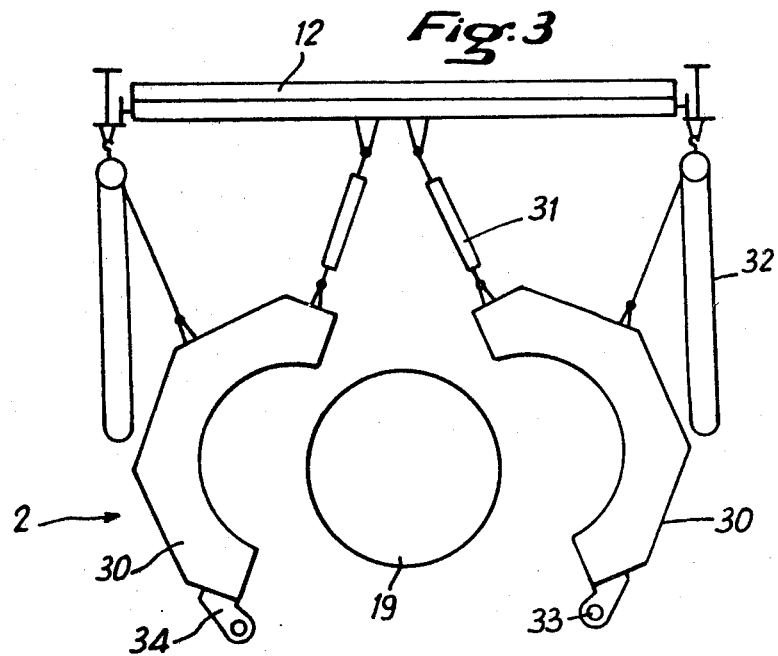
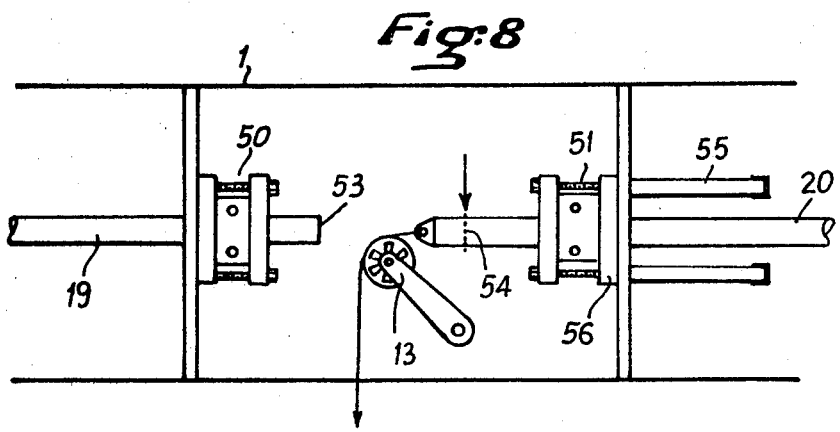
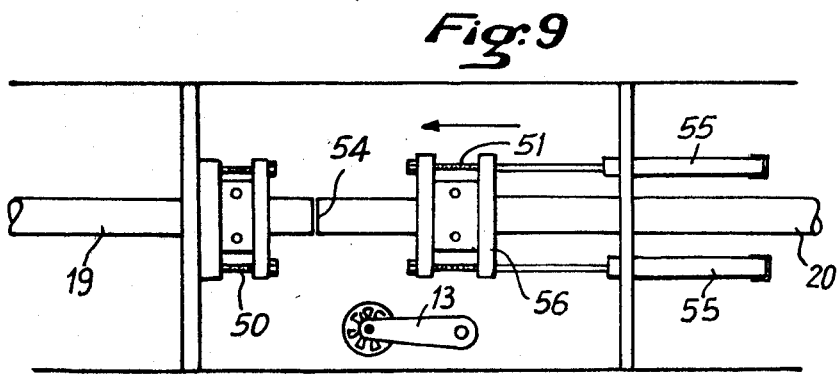

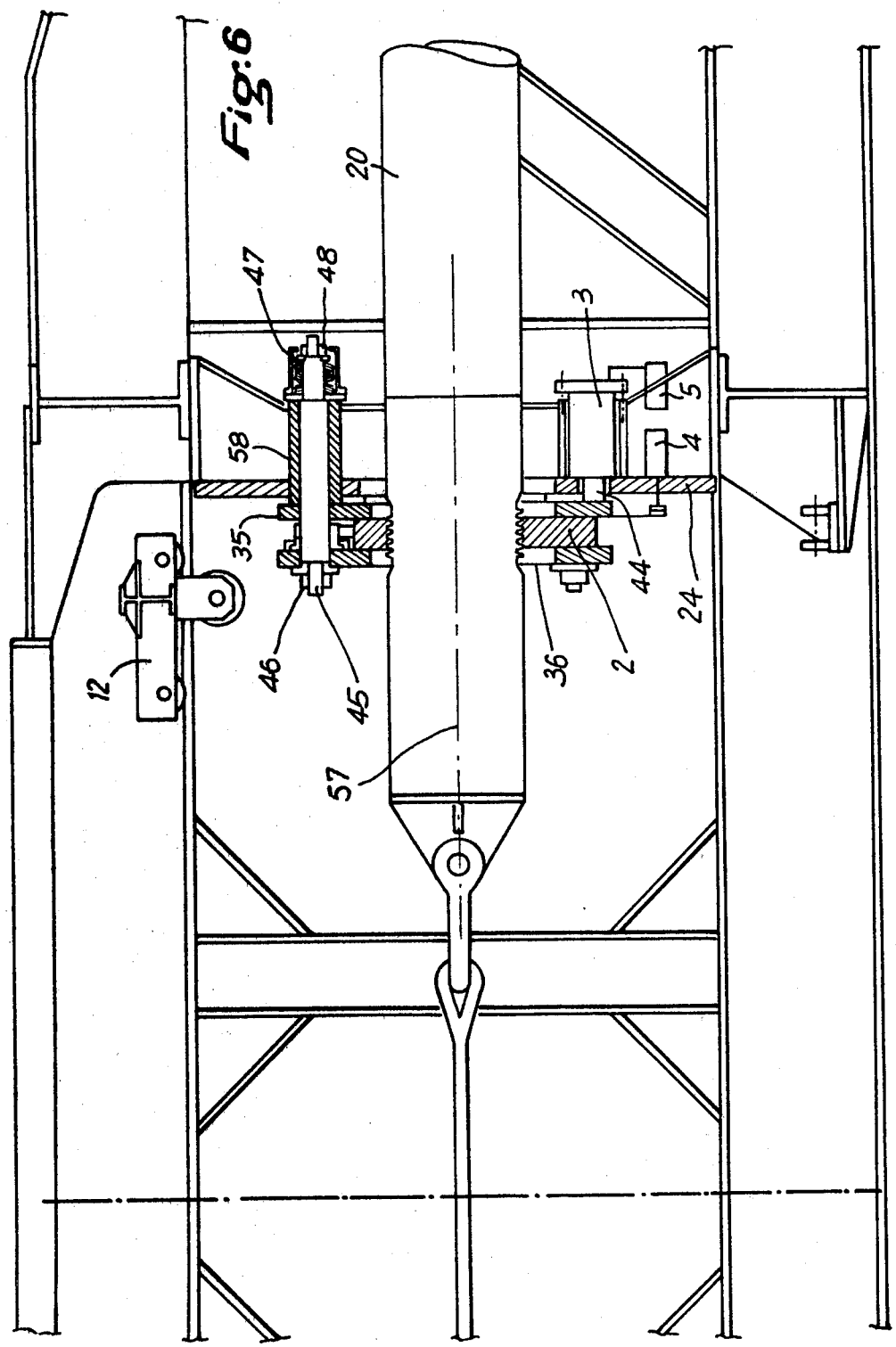

BUTT-WELDING APPARATUS FOR ASSEMBLING AND LAYING PIPE STRINGS IN DEEP WATER

The invention relates to an apparatus for butt-welding pipes or the like of any length, particularly but not exclusively for shipboard welding and inter alia for butt-welding a pipe which may be partly laid in deep water to a towed pipe whose length can be of the order of 3,000 meters.

Various shipboard butt-welding apparatus are known, but all that they effect is the welding of short pipe elements some tens of meters long to the exposed end of a partly laid pipe. Apparatus of this kind therefore make it necessary to have a large stock of pipe elements on board and call for frequent transhipment, something which the swell often makes difficult.

The immediate advantage of apparatus of the type with which the invention is concerned is to make it unnecessary to have repeated and numerous welding operations at sea, since the towed pipe can be made on land in any conditions considered necessary to ensure high-quality weld runs. Welds must be of high quality since pipes for submersion in deep water are made of high-strength steels.

The invention therefore obviates the need for the on-board storage of pipe elements and, in contrast to conventional methods requiring rapid welding operations, enough time is available to make welds suitable for high-strength steels.

According to the invention there is provided apparatus for butt-welding two pipe ends, including means for compensating for shrinkage caused by the welding operation and by the preheating of the welded ends.

The apparatus may include means for locating and securing thereto the pipes to be butt-welded to one another.

Consequently, the first weld runs, which mainly determine weld quality, can be made in optimum conditions and without the shrinkage effects to which first runs are very sensitive.

The apparatus may include means for detecting forces experienced by the end of one pipe, e.g. the partly laid pipe, the compensating means acting on the end of the other pipe, e.g. the towed pipe.

The apparatus can therefore be very flexible since the forces which have to be applied by the compensating means can be determined at any time throughout the phases of the welding operation.

To further increase the accuracy with which reactions arising during welding are controlled any movement of the towed pipe end relatively to the frame of the apparatus may be controlled. Consequently, when the forces applied to the towed pipe and their effects are known, the forces can be adjusted so as to obviate any shrinkage throughout the welding operation.

The compensating means compressive forces may be applied by means of reciprocating actuators (rams) rigidly secured to the frame, the ram rods acting on jaws for securing the towed pipe end to the apparatus. This feature provides a very convenient way of adjusting the required forces.

The compressing rams may have sufficient provision for movement so as to move the towed pipe sufficiently to bring the end thereof, after cutting of the bevels, into abutment with the partly laid pipe. This feature obviates the need to provide a connecting tube or connector element or the like between the pipes to be joined.

The invention will be more fully understood from the following description of an embodiment thereof, given by way of example only, with reference to the accompanying drawings.

In the drawings:

FIG. 1 is a diagrammatic view in elevation of an embodiment of a butt-welding apparatus according to the invention with a pipe positioned therein;

FIG. 2 is an enlarged view of the compensation facility means of the apparatus of FIG. 1;

FIG. 3 is a diagrammatic end view of pipe securing means of the apparatus of FIG. 1;

FIG. 5 is a diagrammatic view of the apparatus of FIG. 1 showing the positioning of a towed pipe end;

FIG. 6 is an enlarged view showing the end of the pipe of FIG. 5 ready for bevelling;

FIG. 7 is a diagrammatic view of the apparatus of FIG. 1 after positioning of a connecting tube between two pipes to be welded;

FIG. 8 is a diagrammatic view of an alternative form of the compensation means;

FIG. 9 is a diagrammatic view of a modification of the compensation means for use in which the pipe ends are to be butt-welded directly together.

Figure 4:
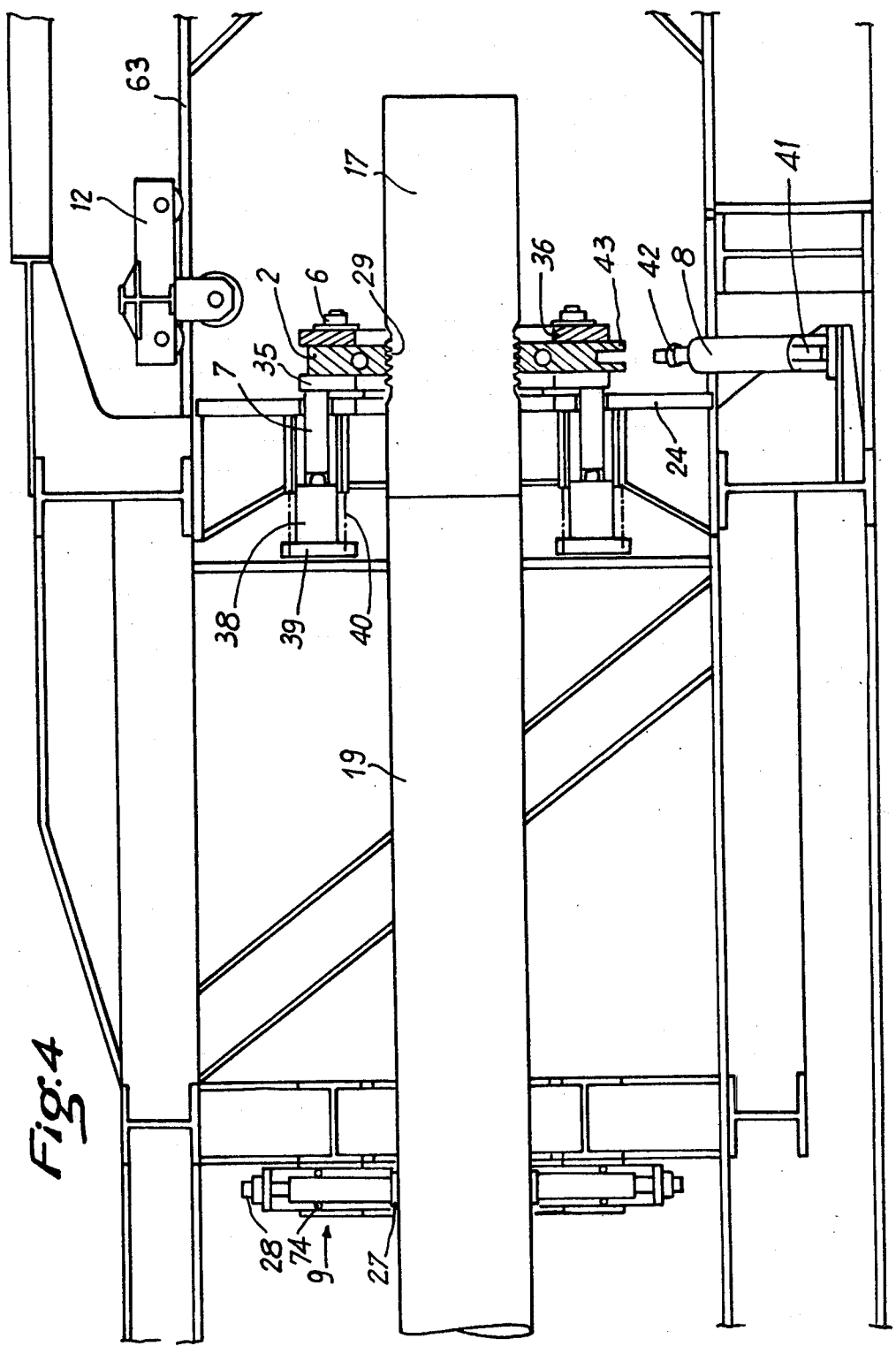
FIG. 4 is a diagrammatic view of part of the apparatus of FIG. 1 showing a pipe end ready to be butt-welded.

As can be seen from FIGS. 1 and 7, a frame 1 of the apparatus is carried on two bearers 15, 16 secured to a ship 21. Frame 1, which comprises longitudinal members 22 and appropriate transverse stiffeners, such as stiffener 23 in FIG. 7, is formed with a top aperture for the connecting tube or connector element or the like 18 (FIG. 7) which is adapted to connect an end 53 of a laid pipe 19 to end 54 of a towed pipe 20. Guide rollers 10 for the pipes 19, 20 are provided at the ends of the frame 1, the pipes also being carried on intermediate rollers 11 which can be plastics-covered. Means for securing the ends of the pipes 19, 20 are carried on supports 24. Any suitable means, such as means 25, can be provided to move the pipe 19 in the apparatus.

As well as the supports 24, there are supports 26 for intermediate clamping or securing bearings 9, of which that for the laid pipe 19 can be seen more clearly in FIG. 4. In this embodiment each bearing 9 consists of three jaws 27 which are applied by a screw clamping device 28 to the pipe 19.

Figure 10:
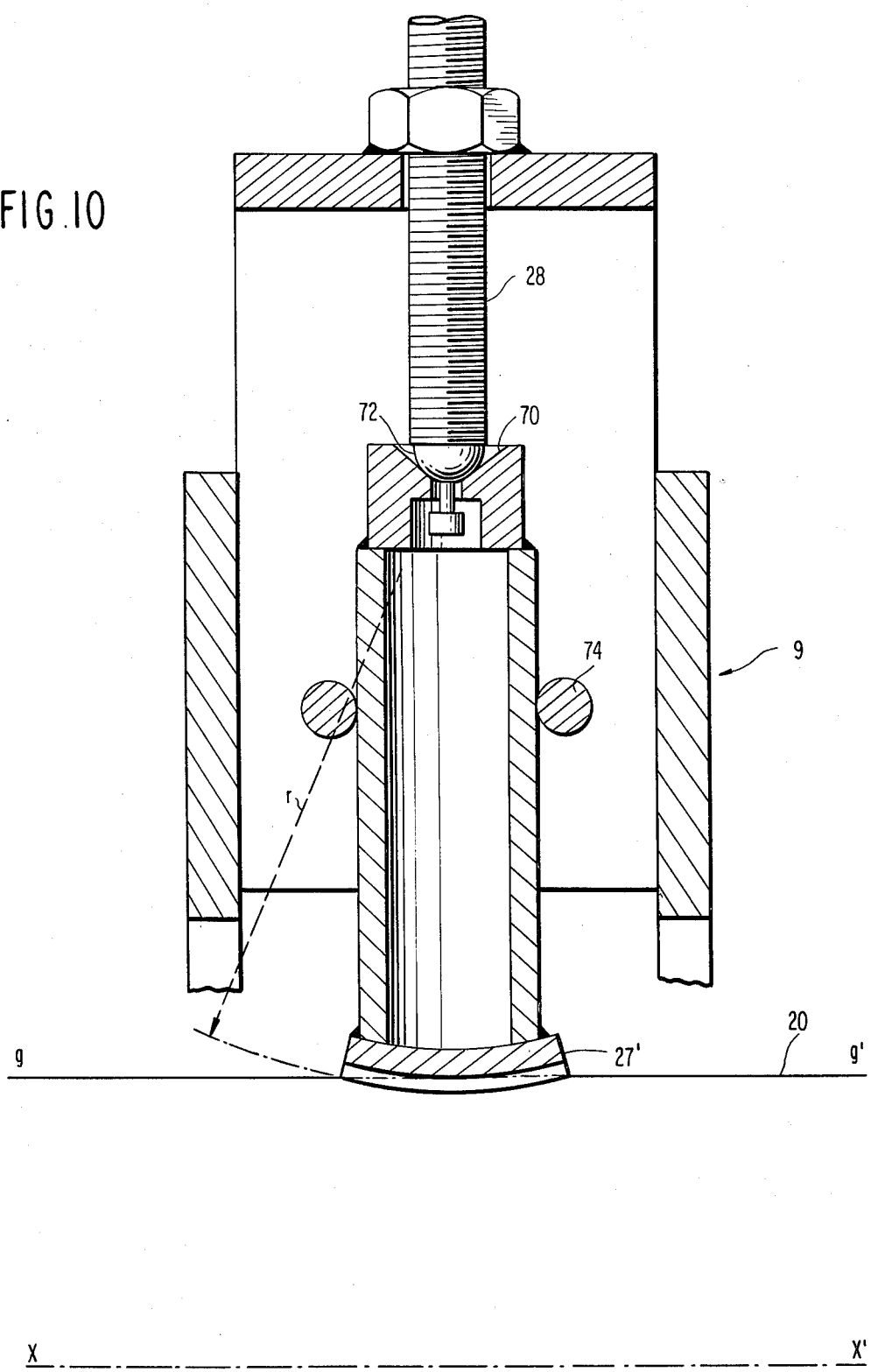
FIG. 10 is a diagrammatic view of the bearing 9 cooperating with the towed pipe 20.

The bearing 9 which cooperates with the towed pipe 20 differs from the bearing 9 associated with the laid pipe 19 (FIG. 4) in that in the bearing 9 for the towed pipe 20 each jaw 27 is pivoted to the screw 28 so that that part of the jaw 27 which bears on the pipe 20 can move therewith. As shown in FIG. 10, the jaw 27 is pivoted relative to the screw by a frusto-conical surface 70 cooperating with the lower end 72 of the screw 28. Accordingly, the jaw 27 is in the form of a sheet metal torus 27' whose radius r is equal to the distance between the generatrix of the pipe 20 and the end of the clamping screw 28. In FIG. 10 the upper generatrix of the pipe 20 is shown as line g–g'. The bars 74 shown in FIGS. 4 and 10 are used for initial positioning of the jaw 27 relative to the pipe. The pipe 20 can therefore be secured with limited provision for lengthwise movement of a few millimeters.

To facilitate a check on the forces experienced by the laid pipe 19, the end thereof is fitted with a tubular member 17 (FIG. 2) having trapezoidal screwthreading 29 adapted to cooperate with a fixing nut 2 (FIG. 3). The nut 2 comprises two half-shells 30 whose internal peripheries are screwthreaded to correspond with the screwthreading 29 of the member 17. The half-shells 30 are suspended with the interposition of turnbuckles 31 on a carriage 12 comprising handling means 32, and running on rails 63 (FIGS. 2 and 4). The nut 2 can therefore readily be moved into a position opposite the screwthreading 29 of the member 17, whereafter the half-shells 30 are closed around the member 17 and held together by means of a pin which is placed in apertures 33 in lugs 34.

The pipe 19 is then moved back until the nut 2 abuts a backplate 35. A clamping flange 36 is then brought into engagement with the nut 2 and assembled therewith by means of pins 6. Rods 7 transmit the forces on the system 2, 35 to four strain gauges 38 which are secured to frame 1 by a flange 39 and four rods or the like 40 and are connected to transmission and display means.

So that the position of the member 17 may be adjusted accurately during the assembly of the nut 2 and backplate 35, rams 8 (FIG. 4) which are articulated at 41 to the frame 1 are provided. A rod 42 is secured for this purpose to a yoke 43. Adjustment is made for both vertical and lateral location of the pipe end.

In operation the towed pipe 20 is lifted into the apparatus by means of pulley 13 (FIG. 5) whereafter, as can be seen in FIG. 6 and as just described for the pipe 19, a nut 2 is assembled between clamping flange 36 and backplate 35. However, as shown in FIG. 6, the backplate 35 cooperates, not with strain gauges as in FIG. 4, but with rods 44 of rams 3 rigidly secured to support 24 of frame 1.

The usual practice is for the backplate 35 to be located by studs or pins or the like whose axes are parallel to one another but which are not shown in order not to overload the drawings. Such pins are rigidly secured to the support 24 and serve as a support and guideway for the backplate 35. Before the rams 3 are operated, clamping pins 45 screwthreaded at each of their ends apply the assembly of parts 2, 36, 35 to the rest support. Accordingly, a clamping nut 46 is secured to one end of each pin 45 and an adjusting nut 48 is secured to the other end thereof and provides for variable compression of a stack of spring washers or the like 47. The pins 45 which secure the nut 2 to the backplate 35 can therefore move in the sleeve 58 parallel to the longitudinal axis 57 of the apparatus.

When operated, the rams 3 apply to the backplate 35 sufficient force to move the towed pipe 20 a few tens of millimeters. The rams 3 can be operated by way of a hydraulic circuit operated by an ordinary hand pump. A device 4 is provided for measuring the movement of the support 24 relatively to the backplate 35, and a pressure detector 5 is provided.

When the end of the partly laid pipe 19 has been introduced into the apparatus, the rear part of the pipe being guided by any appropriate means including rollers 10, its end is secured by means of the nut 2 and member 17 to the support 24. Once the pipe has been immobilized by the clamping bearing means 9, its end cannot move at all during welding despite sea swell. The end of the member 17 is then cut, as shown in FIG. 4, to prepare the bevels at the end 53 (FIG. 7).

The same procedure is followed for the towed pipe 20, the nut 2 being in this case associated with the shrinkage compensation mechanism in the form of the rams 3, clamping of the nut 2 to the backplate 35 by means of the pin 45 and spring washers 47 helping to compensate for any compressive forces acting on the pipe 20.

After the end of the member 17 of pipe 20 has been cut and bevels at the end 54 (FIG. 7) required for welding have been prepared, the connector element 18 is lowered into the position shown in FIG. 7. After the element 18 has been centred and secured, pre-heating is effected, whereafter the rams 3 are operated to take up weld shrinkage. The weld beads are then made with supervision of movements of the backplate 35 and of the forces transmitted to the strain gauges 38, the pressure of the rams 3 being indicated by pressure detector 5, preferably for each individual ram 3. Consequently, it is now possible to produce satisfactory welds in any circumstances, because the pipe ends 53, 54 are completely stationary and vibrations are completely prevented because of the action of the nuts 2 and of the adjacent clamping bearing means 9. More particularly, it is possible to produce welds requiring special treatment, as is the case with high-strength steels, since no force likely to impair the weld can occur in the first runs, shrinkage due to welding and to cooling of the preheated parts being compensated for by means of the rams 3 which during welding apply a greater force than any tension which could be applied to the pipe 20.

Clearly, the invention is intended to cover the use of equivalent means. More particularly, cutting of the ends of the laid pipe and towed pipe can be followed not by the insertion of a connector element or the like but, and as shown in FIGS. 8 and 9, by bringing together the cut ends 53, 54 of the pipes 19, 20. To indicate the similarity of the apparatuses, there can be seen the pulley 13 for raising the towed pipe 20. Since the clamping means 50, 51 serving as jaws for the pipes 19, 20 are similar to the means described above, it will be apparent that all that is necessary is to provide either extra rams 55 acting on a backplate 56 fulfilling the function of the support 24 of FIG. 6, or rams 55 fulfilling the function of the rams 3, the plate 56 being able or not, as required, to fulfill the function of the backplate 35 to bring end 54 of the towed pipe 20 into engagement with end 53 of pipe 19, whereafter the welding step is carried out with shrinkage compensation.

We claim:

1. Apparatus for butt-welding two pipe ends comprising means for compensating for shrinkage caused by the welding operation and by the preheating of the welded ends, the compensating means being provided on said apparatus near one pipe end to urge one pipe end against the other pipe end, said compensating means comprising reciprocating actuators acting between the frame of the apparatus and a first jaw secured adjacent one of the pipe ends, a second jaw secured adjacent the other pipe end and acting on strain gauges bearing on said frame of said apparatus, said first and second jaw comprising two half-shells together forming a nut which is internally screw-threaded for engaging screw threading on the pipe ends.

2. Apparatus according to claim 1, wherein said second jaw acts on said strain gauges via longitudinal rods movable parallel to the longitudinal axis of said apparatus.

3. Apparatus for butt-welding pipe ends including means for compensating for shrinkage caused by the welding operation and by the preheating of the welded ends, compensating means comprising reciprocating actuators acting between the frame of said apparatus and a first jaw secured adjacent one of the pipe ends, said first jaw being retained by a pin movable parallel to the longitudinal axis of said apparatus and which is biased against said compensating means by springs which bear upon a support of the apparatus.

4. Apparatus according to claim 3, wherein the force applied by said biasing springs is adjustable.

5. Apparatus for butt-welding two pipe ends, including means for compensating for shrinkage caused by the welding operation and by the preheating of the welded ends, said compensating means being provided on said apparatus near one pipe end to urge one pipe end against the other pipe end, said compensating means comprising reciprocating actuators acting between the frame of said apparatus and a first jaw secured adjacent one of the pipe ends, a second jaw secured adjacent the other pipe end acting on strain gauges bearing on said frame of said apparatus, said second jaw acting on said strain gauges via longitudinal rods movable parallel to the longitudinal axis of said apparatus, means for guiding the pipe ends longitudinally of said apparatus, at least one securing means for securing said pipe ends to the frame adjacent said jaws, and one of said securing means including means permitting limited displacement thereof relative to said frame to take up movements caused by said compensating means.

6. Apparatus according to claim 5, wherein said securing means includes pivoted members having ends for contacting the pipe generatrices which are toroidal.

* * * * *